(12) United States Patent
Wajda

(10) Patent No.: US 7,212,544 B2
(45) Date of Patent: May 1, 2007

(54) METHOD OF AND APPARATUS FOR TRANSMITTING DATA AT A TIME-VARIABLE DATA RATE

(75) Inventor: Wieslawa Wajda, Keltern (DE)

(73) Assignee: Alcatel, Paris (FR)

( * ) Notice: Subject to any disclaimer, the term of this patent is extended or adjusted under 35 U.S.C. 154(b) by 1107 days.

(21) Appl. No.: 10/136,298

(22) Filed: May 2, 2002

(65) Prior Publication Data

US 2002/0167968 A1 Nov. 14, 2002

(30) Foreign Application Priority Data

May 12, 2001 (DE) ................. 101 23 193

(51) Int. Cl.
*H04J 3/16* (2006.01)
*H04J 3/22* (2006.01)

(52) U.S. Cl. ................. 370/468; 370/230; 370/477

(58) Field of Classification Search ............ None
See application file for complete search history.

(56) References Cited

U.S. PATENT DOCUMENTS

| | | | | |
|---|---|---|---|---|
| 5,805,599 | A * | 9/1998 | Mishra et al. | 370/468 |
| 6,408,005 | B1 * | 6/2002 | Fan et al. | 370/412 |
| 6,496,504 | B1 * | 12/2002 | Malik | 370/390 |
| 6,563,829 | B1 * | 5/2003 | Lyles et al. | 370/395.21 |
| 6,667,956 | B2 * | 12/2003 | Beshai et al. | 370/238 |
| 6,785,252 | B1 * | 8/2004 | Zimmerman et al. | 370/337 |
| 6,862,295 | B1 * | 3/2005 | Stacey et al. | 370/466 |
| 6,940,871 | B1 * | 9/2005 | Grossmann | 370/468 |
| 6,980,511 | B1 * | 12/2005 | Li et al. | 370/230 |

FOREIGN PATENT DOCUMENTS

| | | |
|---|---|---|
| DE | 197 55 385 A1 | 6/1999 |
| DE | 199 30 228 A1 | 1/2001 |
| EP | 0 975 116 A2 | 1/2000 |

* cited by examiner

*Primary Examiner*—Chirag G. Shah
(74) *Attorney, Agent, or Firm*—Sughrue Mion, PLLC

(57) ABSTRACT

The present invention relates to a method of transmitting data at a time-variable data rate, to a connection control module for a network facility (SW1, SW2) therefor, and to a communications module for a user terminal (T1–T5) therefor. In the method, a user terminal (T1–T5) sends to a facility (SW1, SW2) of a network (NET) a request for a connection to a communication partner (T1–T5; CS1, CS2) with a guaranteed data rate (DVT1, DVT2, DVG1, DVG2). The network (NET) establishes the connection and makes the guaranteed data rate available therefor. The user terminal (T1–T5) performs a first data transfer on the connection to the communication partner. Then the connection is released. During the existence of the connection, the performance of the following steps is proposed: determining a portion (FVT1, FVT2, FVG1, FVG2) of the guaranteed data rate not currently used by the user terminal; releasing the unused portion for at least a second data transfer; and, if necessary, again making available the entire guaranteed data rate, including the previously released portion, to the user terminal.

21 Claims, 3 Drawing Sheets

METHOD OF AND APPARATUS FOR TRANSMITTING DATA AT A TIME-VARIABLE DATA RATE

BACKGROUND OF THE INVENTION

The invention is based on a priority application DE 101 23 193.8 which is hereby incorporated by reference.

This invention relates to a method of transmitting data at a time-variable data rate as set forth in the preamble of claim 1, to a communications module for a user terminal for carrying out such data transmission as set forth in the preamble of claim 8, and to a connection control module for a network facility of a network for carrying out such data transmission as set forth in the preamble of claim 10.

In the case of telephone networks it is known that a user terminal, such as a telephone set, establishes a connection to a communication partner, such as a second telephone set, through the telephone network, with a guaranteed data rate being made available for the connection. If the connection is set up through an integrated services digital network (ISDN), for example, at least one B channel with usually 64 kb/s is provided for the connection, so that a data rate sufficient for voice transmission is available. The telephone network reserves the data rate for the connection irrespective of whether it is actually used. The connection is also maintained during pauses in the conversation, for example.

A similar situation results if a connection is established from a user terminal, e.g., a personal computer, over a telephone network to the Internet. Even if the capacity of the connection through the telephone network is not fully utilized by data being transmitted from the Internet to the user terminal or vice versa, for example because a bottleneck occurs in the Internet, the telephone network will make available a constant guaranteed data rate for the connection between user terminal and Internet.

Accordingly, the capacity of a telephone network must be designed for a peak load, the maximum traffic experienced by the network.

In packet-oriented data networks, particularly in connectionless data networks, the initial situation in this respect is different. Such data networks are inherently flexible in terms the type of data to be transmitted or the bandwidth made available to a user, so that their capacity can be optimally utilized. If more data packets have to be transmitted than can currently be handled by the data network, these packets will be buffered at the user end and/or in the network or discarded until sufficient transmission capacity is available again.

When a user is "surfing" on the Internet with an Internet browser and only retrieving text and video data from the Internet or sending individual control commands, e.g., requests for such video data, to the Internet, time delays due to insufficient transmission capacity of the Internet and/or of an access network to the Internet are not particularly annoying to the user. A somewhat slower picture setup in the browser or a slightly delayed response to a request for data from the Internet is generally acceptable.

Things are different, for example, if the user retrieves a video sequence or speech data from the Internet or wants to send such information to the Internet. If, in that case, too little transmission capacity is made available to the user, i.e., if the data rate during transmission is too low, this may result in interrupted and/or torn video or speech sequences.

SUMMARY OF THE INVENTION

It is therefore an object of the invention to provide methods of and apparatus for transmitting data at a time-variable data rate such that a guaranteed data rate is always made available to a user terminal having established a connection through a network, and that the capacity of the resources of the network is utilized in an optimum fashion.

This object is attained by a method according to the technical teaching of claim 1, by a communications module for a user terminal according to the technical teaching of claim 8, and by a connection control module for a network facility according to the technical teaching of claim 10.

The basic idea of the invention lies in the fact that a guaranteed data rate is always made available to a user terminal on a connection set up through the network to a communication partner, for example a further user terminal and/or a data server. If and to the extent that the user terminal does not currently use the data rate, for example because the data rate is actually intended for the transmission of video data while the user terminal is currently making only a voice call, the unused portion will be released for a second data transfer. The network can use the released transmission capacity for the transmission of data which relate to further user terminals. If, however, the user terminal that originally requested a guaranteed data rate needs this data rate again because it wants to transmit video data following the voice transmission, the network will again make the entire guaranteed data rate, including the previously released portion, available to the user terminal. As the user terminal always has the respective necessary data rate, if necessary up to the guaranteed data rate, at its disposal, it does not "notice" that a currently unused portion of the guaranteed data rate is temporarily not available to it. At any rate, the transmission capacity of the network is thus utilized in an optimum fashion without impairing the transmission quality for the user terminal.

Advantageous developments of the invention are apparent from the dependent claims and the description.

For the determination of the currently unused portion of the guaranteed data rate, several variants are conceivable:

On the one hand, the currently unused data rate and/or the actually required data rate can be determined at the user end and/or by the network. For example, the user terminal and/or a program module executed thereby, such as a browser or a communications module, may notify the network, particularly a network facility, what data rate is necessary for a data transfer that is about to take place. If, for example, the guaranteed data rate suffices for the transmission of video data but the user terminal requests only speech or text data, the user terminal will notify this to the network. The network can then use the portion of the guaranteed data rate not currently needed by the user terminal for another data transfer.

It is also possible, however, that the determination as to which data rate is actually being used by the respective user terminal is made by the network. This could be done, for example, by monitoring data packets that are being sent by the user terminal. If, for example, a data stream that is being sent or received by the user terminal is being transmitted at a time-variable data rate, this can be determined by the network, particularly by a checking facility of the network. For example, there may be prolonged pauses between the data packets to be transmitted, and/or empty packets or idle cells may be transmitted for lack of data. At any rate, the network can determine these gaps or idle packets and use them for one or more further data transfers. For example, packets can be inserted into the gaps of a data stream, or user-data packets or cells can be transmitted in place of empty packets or idle cells.

Preferably, the data transmitted within the scope of the guaranteed data rate have a high quality of service. This may be real-time data, for example, which are transmitted between two user terminals in a voice and/or video communication.

Those data which are only transmitted when the guaranteed data rate is not needed by the user terminal are preferably data with a comparatively low quality of service, such as pure text data or the like.

According to a further advantageous development of the invention, the data transmitted at the guaranteed data rate within the scope of the connection are transmitted using a connection-oriented protocol. For data transmitted only on a case-by-case basis, i.e., data transmitted only when the guaranteed data rate is not used, a connectionless protocol may advantageously be provided. It is to be understood, however, that connectionless protocols or connection-oriented protocols can be used in both cases. Connection-oriented protocols are particularly advantageous because they permit a guaranteed, continuous data transfer as is appropriate for the transmission of video or speech sequences, for example. Connectionless protocols allow a more dynamic utilization of the transmission capacity, which need not be reserved. However, error treatment during data transmission, or rerequesting of data when data has been lost, is not yet ensured by the protocol itself and must be carried out by the terminals involved in the data transmission if necessary.

It is to be understood that arbitrary combinations of the measures and arrangements set forth in the claims and the description are also possible.

BRIEF DESCRIPTION OF THE DRAWINGS

The invention and its advantages will become more apparent from the following description of an embodiment, taken in conjunction with the accompanying drawings, in which.

Figure 1:
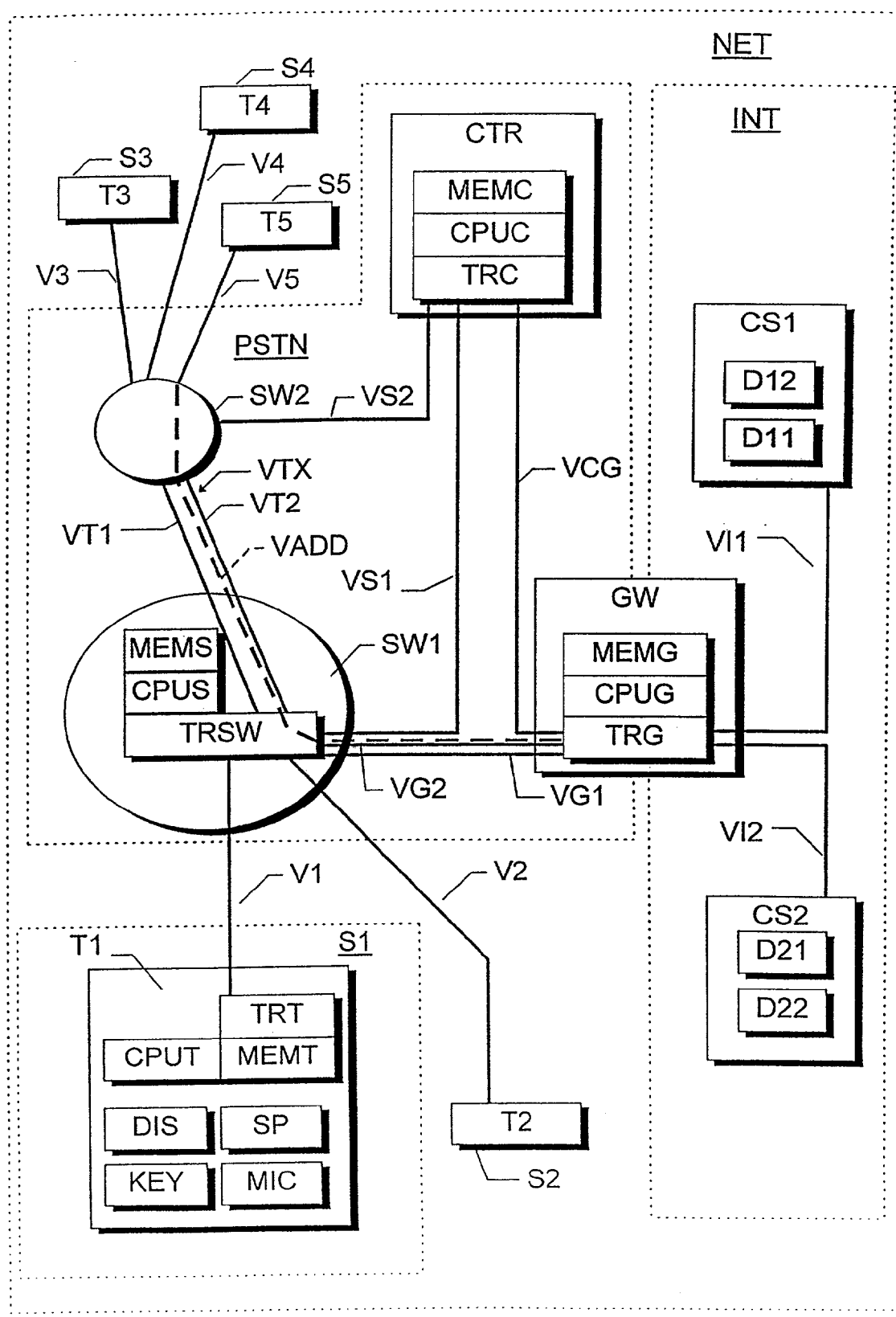
FIG. 1 shows a network NET to which are connected user terminals T1 to T5 which can set up connections between each other and to data servers CS1, CS2 through the network NET.

In the embodiment shown, the network NET comprises a switched communications network PSTN and a packet-switched data network INT. The communications network PSTN may be, for example, a public telephone network, such as an integrated services digital network (ISDN) and/or a mobile radio network. The data network INT may be, for example, the Internet or any other packet-switched data network, which may be based on different physical networks, such as an Ethernet and/or an ATM network (ATM=asynchronous transfer mode). The network NET and its subnetworks PSTN and INT may also be local networks, such as LANs (local-area networks) or WANs (wide-area networks).

In principle, the communications network PSTN may also be based on a data network which is packet-switched as such, but on which logical channels with a predetermined data rate guaranteed by the respective data network can be created, the logical channels then being "switched", so to speak. This is possible in an ATM network, for example. In any case, the communications network PSTN makes available guaranteed qualities of service (QoS) with guaranteed data rates for the transmission of data, and advantageously provides protection against unauthorized access to data thus transmitted. In another advantageous solution, the communications network PSTN is a so-called label switching network, for instance a multiprotocol label switching (MPLS) network, in which the connections are routed with secure quality of service through so-called label switching tunnels or MPLS tunnels.

Of the communications network PSTN, network nodes SW1, SW2 and a network controller CTR are shown, which exemplify further facilities (not shown) of the communications network PSTN. The network nodes SW1 and SW2 may be switching centers, also mobile service switching centers, for example. The network controller CTR may form part of a network management system for controlling the facilities of the communications network PSTN. In the present case, the network controller controls connections which are established, maintained, and released by the network nodes SW1, SW2.

Of the data network INT, only data servers CS1, CS2, from which data, such as video sequences, speech sequences, Internet pages, and the like can be retrieved, are shown as examples of further equipment. A gateway GW connects the communications network PSTN to the data network INT. The gateway GW performs any data conversions, protocols conversions, and the like that may be necessary.

The network nodes SW1, SW2, the network controller CTR, and the gateway GW contain control means CPUS, CPUC, CPUG, which may be individual processors or processor arrays, for example, storage means MEMS, MEMC, MEMG, e.g., hard disk drives, RAM modes, or the like, and connection means TRSW, TRC, TRG, which are suited for establishing data and/or signaling connections. The connection means TRSW and TRG may also contain a switching network or any other switching matrix, for example. Further building blocks of the network nodes SW1, SW2 as well as of the network controller CTR and the gateway GW, such as input/output means, supervisory units, or the like, are not shown for simplicity. At any rate, the network nodes SW1, SW2, the network controller CTR, and the gateway GW are controlled by program modules that are executed by the control means CPUS, CPUC, CPUG. As an example of such a program module, a connection control module VCTL is shown at the network node SW1 (FIGS. 2 and 3) and at the network controller CTR (FIG. 3).

The user terminals T1, T2 are connected to the network node SW1 via links V1, V2, and the user terminals T3, T4, T5 are connected to the network node SW2 via links V3, V4, V5. The links are wireline or wireless links, e.g., subscriber lines or radio links which may run through further access equipment (not shown) of the communications network PSTN, such as remote line units or bay stations. Each of the links V1 to V5 may contain several transmission channels. For example, the link V1 may be an ISDN subscriber line, which contains two B channels for voice and data transmission as well as one D channel for signaling purposes and, if necessary, for data transmission. The link V2 may be, for example, an UMTS radio link on which a number of voice, video, and data channels can be established and released constantly or on demand.

The user terminals T1 to T5 are, for example, personal computers, telephone terminals, mobile telephones, PDAs (Personal Digital Assistants), or the like. From a functional point of view, the user terminals T1 to T5 are identical in construction and comprise a central control means CPUT, e.g., one or more processors, storage means MEMT, e.g., RAM modules (RAM=random-access memory) or magnetic storages, such as hard disk drives or the like, and connection means TRT, such as an interface module for wire and/or wireless communication. Further functional assemblies shown at the user terminal T1 are a display means DIS, for example a monitor or a liquid crystal display (LCD), a loudspeaker SP, a microphone MIC, and input means KEY, for example a keyboard and/or a mouse. The control means CPUT controls the user terminal T1, assisted by program modules which are stored in the storage means MEMT and whose program code is executed by the control means CPUT. As examples of further program modules, a communications module KOM and an Internet browser BRW are shown (FIG. 2); their respective functions are explained in detail below.

Via the communications network PSTN, the user terminals T1 to T5 can establish connections between each other and to the data network INT. For this, guaranteed minimum data rates are necessary on parts of the respective connections and not necessary on other parts. Through its mode of operation according to the invention, the communications network PSTN ensures that its capacity is optimally utilized. This will now be illustrated by means of some examples of connections between the user terminals T1 to T5 and from the user terminals to the data networks INT.

In a first scenario, user terminals T1 and T2 are requesting from the communications network PSTN connections to the user terminals T3 and T4, respectively. For each of these connections, a guaranteed data rate is necessary, because speech and/or video data are to be transmitted in real time, for example. In accordance with the connections requests, the communications network PSTN establishes a connection V1, VT1, V3 between the user terminals T1 and T3 as well as a connection V2, VT2, V4 between the user terminal T2 and T4. Thus, users S1, S3 and S2, S4, who are associated with the user terminals T1, T3 and T2, T4, respectively, can speak to each other and, if necessary, carry out video telephony, for example.

The connections VT1, VT2 between the networks nodes SW1, SW2 are provided by a tie trunk VTX, e.g., by one or more channels each on the tie trunk VTX. The connections VT1, VT2 may be logical channels or physical channels, but also genuine physical lines. In the embodiment, for purposes of illustration, the transmission capacity of the tie trunk VTX has already been used up. A further connection cannot be established on the tie trunk VTX.

The tie trunk VTX may be a direct line between the network nodes SW1, SW2 or a line that may run through further switching centers, e.g., long-distance switching centers, or through a transmission network (not shown), e.g., an SDH network (SDH=synchronous digital hierarchy). At any rate, in the present scenario, a user S5 could no longer set up a connection from his or her user terminal T5 to the data network INT through the communications network PSTN if the latter were designed as a conventional communications network, because this would necessitate capacity on the tie trunk between the network nodes SW2, SW1. The communications network PSTN operating in accordance with the invention, however, enables the user terminal T5 to send data to and receive data from the data network INT on a dashed connection VADD. For this purpose, a portion of the data rate guaranteed for the connection VT1 and/or a portion of the data rate guaranteed for the connection VT2 are used, to the extent that these portions are not used by the user terminals T1 to T4. In a video transmission, for example, it is conceivable not to transmit video sequences for the entire duration of the connection, but to transmit freeze frames at given intervals. Furthermore, during a voice call, pauses may occur during the conversation. At any rate, the communications network PSTN determines unused portions of guaranteed data rates.

Figure 2:
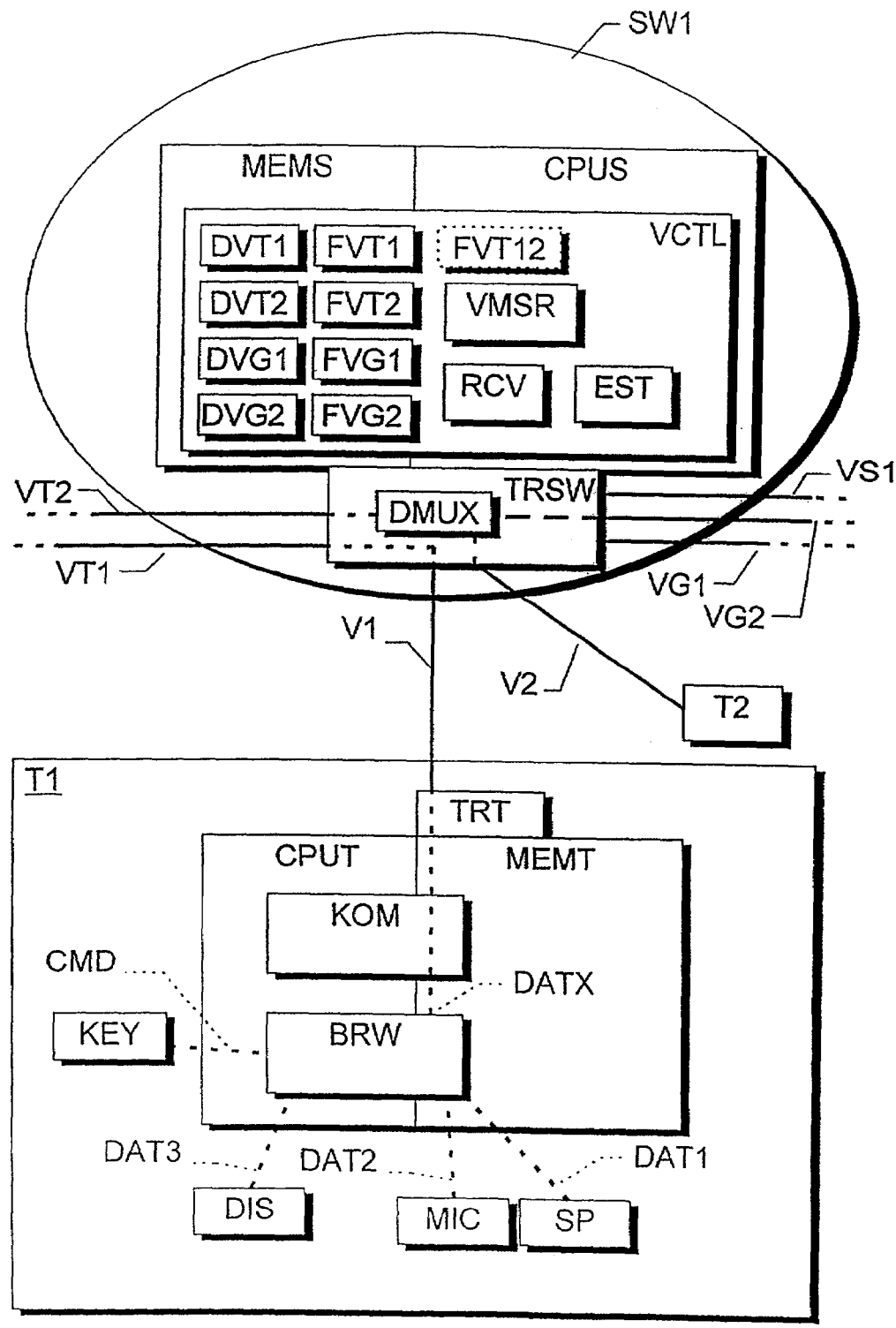
FIG. 2 Is a more detailed diagram of the user terminal T1, which comprises and executes a communications module according to the invention, KOM, and of a network node according to the invention, SW1, which is contained in the network NET, is connected to the user terminal T1, and comprises and executes a connection control module according to the invention, VCTL.
Figure 3:
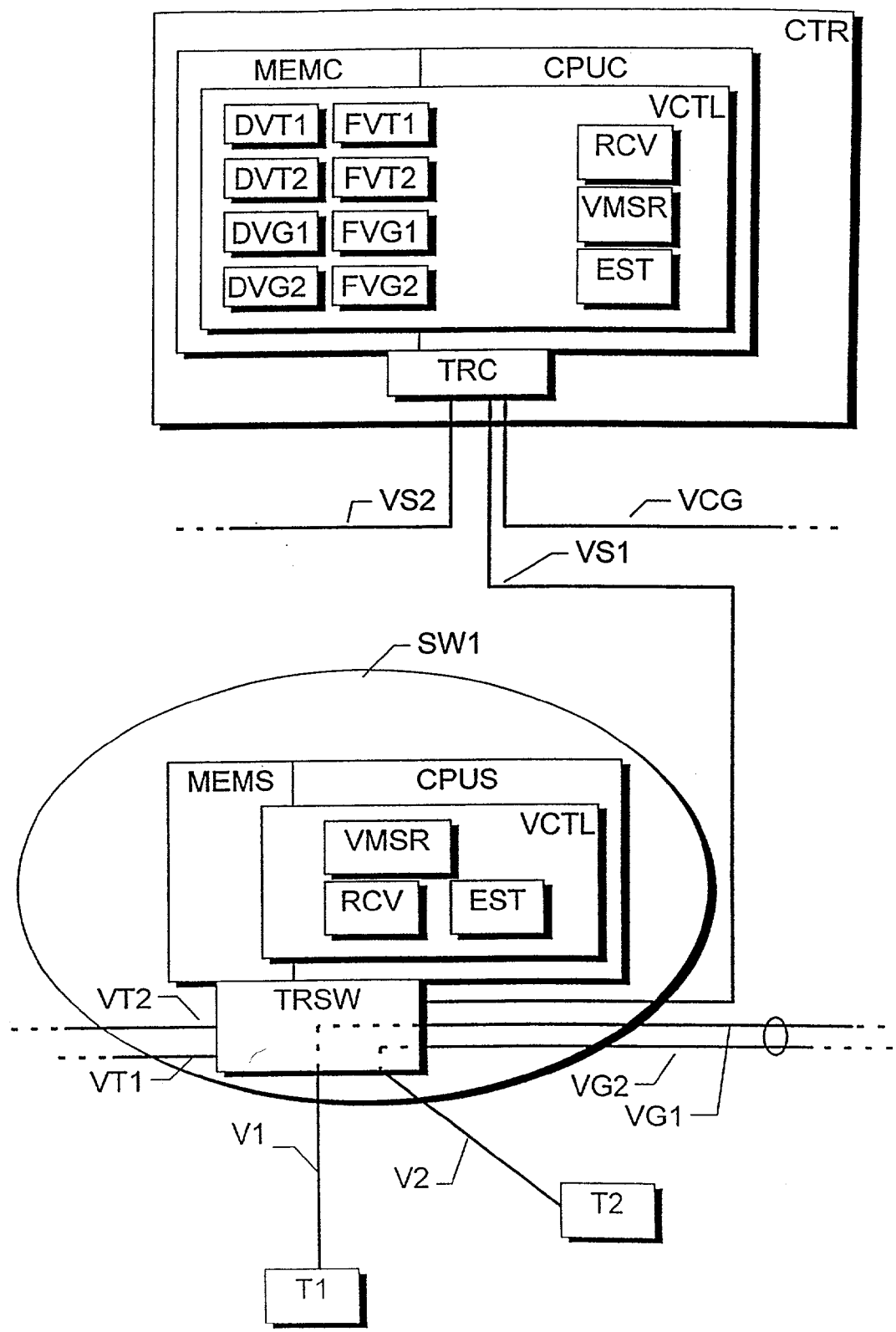
FIG. 3 shows a network node SW1 with a modified mode of operation as compared to FIG. 2, and a network controller CTR of the network NET which is provided for controlling connections established on the network NET in accordance with the invention and which interacts with the network node SW1, among other devices.

For this purpose, the network nodes SW1, SW2 include connection control modules VCTL, of which the connection control module executed by the network node SW1 is shown in detail in FIG. 2.

Of the connection control module VCTL, only a few essential functional units are shown, which may be program functions or routines, for example. The connection control module VCTL incorporates a connection function EST, which serves as a means for establishing connections through the network node SW1. During the establishment of a connection, the connection function EST enters the information about the respective guaranteed data rate needed for this connection into the storage means MEMS. For example, guaranteed data rates DVT1, DVT2 are recorded for the connections VT1, VT2. A measuring function VMSR monitors whether this guaranteed data rate is actually needed on the respective connections VT1, VT2. To this end, the measuring function VMSR counts data packets, for example, which are transferred per unit time on the connections VT1, VT2. It is also conceivable that the measuring function VMSR analyzes contents of the packets transferred on these connections VT1, VT2 and determines, for example, that part of the packets are empty. At any rate, the measuring function VMSR records portions FVT1, FVT2 of the guaranteed data rates DVT1, DVT2 which are not currently used. The portions FVT1, FVT2 are then made available for further data transfers.

The portions FVT1, FVT2 can be used by a multiplexer and/or demultiplexer unit, henceforth called "multiplexer MUX" for short, to insert packets into data streams being transmitted on the connections VT1, VT2 and/or to extract packets from such data streams. Such packets that are additionally inserted into a data stream may be characterized by an identifier, so that the respective receiving station can determine such packets and remove them from the data stream.

In the present case, the network nodes SW1, SW2 are identical in construction, i.e., they each comprise the connection control module VCTL and the (de)multiplexer MUX. Therefore, the user terminal T5 can set up a connection to the data network INT despite the connections VT1, VT2 already established for the user terminals T3, T4. The connection control module VCTL of the network node SW2 inserts packets addressed to the data network INT into data streams being transmitted on the connections VT1, VT2 provided that the latter have gaps and/or contain empty packets. When a pause occurs during a conversation on the connection VT2, for example, i.e., when the guaranteed data rate DVT2 is not fully utilized, the connection control module VCTL of network node SW2 will determine the unused portion FVT2 and insert data packets sent from the user terminal T5 to the data network INT, preferably connectionless packets, into the data stream being transmitted on connection VT2. For this, the multiplexer MUX is suitably controlled by the connection control module VCTL. The (de)multiplexer MUX of network node SW1 removes these packets from the data stream and routes them over a connection VG2 to the gateway GW. The latter then routes the packets to the data server CS2, for example. The packets contain, for example, a request to the data server CS1 to send data D12 and/or data D11 to the user terminal T5.

The data D11, D12 are, for example, Internet pages, program files, or the like. The data server CS1 then transfers the data D11, D12 over a link V11 of the data network INT, which may include routers, switches, and the like (not shown), back to the gateway GW, which routes them over the link VG2 to the network node SW1. The task of the latter is to transmit the respective data D11, D12 over the links VT1, VT2, which actually are blocked by the user terminal T1, T2, to the network node SW2. The network node SW1 determines to what extent the guaranteed data rates DVT1, DVT2 are not used, so that corresponding free portions FVT1, FVT2 are present.

It is also possible that the network node SW1 forms respective sums of the guaranteed data rates DVT1, DVT2 and/or respective sums of the unused portions. FIG. 2 shows an unused portion FVT12, for example, which represents the sum of the unused portions FVT1, FVT2. Depending on the presence of free portions FVT1, FVT2 or FVT12, the multiplexer MUX of network node SW1 inserts packets of the data D11, D12 into data streams on the links VT1, VT2, which packets are removed from the respective data streams and forwarded to the user terminal T5 by the (de)multiplexer MUX of the network node SW2.

The unused portions FVT1, FVT2 of the guaranteed data rates DVT1, DVT2 can also be determined and communicated to the network nodes SW1, SW2 by the user terminals T1 to T5. But in this mode of operation, too, which is described in the following, it is possible that the network nodes SW1, SW2 or their connection control modules VCTL measure the portions of the respective guaranteed data rates actually being used by the user terminals T1 to T4 by means of the measuring function VMSR, or check those portions.

In the second scenario, which will now be described, the user terminals T1 and T2 request respective video sequences contained in data D11 and D12 from the data servers CS1 and CS2, respectively. To do this, each of the user terminals T1, T2 sends to the communications network PSTN a request for a connection to the data network ISDN with a guaranteed data rate, here a comparatively high data rate which is necessary for video transmission. Accordingly, a connection V1, VG1, V11 is set up from the user terminal T1 to data server CS1, and a connection V2, VG2, V12 is set up from user terminal T2 to data server CS2. The connection request is generated in user terminal T1 by a browser BRW which is suitable for displaying the video data. The browser BRW is a so-called multimodal browser, which can be controlled not only by control commands CND from the keyboard KEY but also by data DAT2 which are entered as voice commands through the microphone MIC. Further possibilities of controlling the multimodal browser BRW are, for example, that control actions by the user S1 are captured by a video camera (not shown) or the like and interpreted by the browser BRW. In addition, the browser BRW is capable of outputting data, including video data, on different output media. If the user S1 requests a video sequence from the browser BRW, for example by entering a corresponding control command CMD, the browser will send a request to the communications module KOM to establish a connection suitable for video data to the respective provider of the video data, here the data server CS1. The communications module KOM then sends to the network node SW1 a corresponding connection request in which the data rate necessary for the video transmission is specified. The network node SW1 then completes the connection to the gateway GW. Contrary to what is shown in the figure, the link VG1 may include further network equipment, transmission equipment, or the like. In any case, the data rate DVG1 guaranteed on the link VG1 is recorded by the connection control module VCTL. The data server CS1 can thus transmit the data D11 of the video sequence interference-free and without interruptions to the user terminal T1 within the scope of the guaranteed data rate, so that the browser BRW can recover voice output data DAT1 and video output data DAT3 from the data D11 and output them to the loudspeaker SP and the display device DIS, respectively.

If, however, the user S1 stops the reproduction of the video sequence, for example because he or she wants to go away from his or her user terminal T1 for a short time, he or she will, for example, enter a corresponding control command through the microphone MIC, whereupon the browser BRW will send an interrupt command to the data server CS1. In addition, the communications module KOM will send to the connection control module VCTL a control command in which it indicates the short-time interruption of the video sequence. It is possible that the communications module KOM monitors the control commands sent by the browser BRW and determines from these commands what data rate is necessary, and/or that the browser BRW instructs the communications module KOM as to what data rate is actually necessary. It should be noted that the communications module KOM may be incorporated in the browser BRW. In any case, the connection control module VCTL notes that the guaranteed data rate DVG1 is no longer necessary, but that a portion FVG1 of this data rate is available for another data transfer.

The free portion FVG1 can be used, for example, for a transfer of data D22 from data server CS2 to user terminal T3. For this purpose, gateway GW, to be exact, its connection means TRG, comprises a multiplexer-demultiplexer (not shown) which, as already described with reference to the network nodes SW1, SW2, can insert data packets into and/or extract data packets from data streams.

It is also possible that the user terminal T2 deregisters, to speak, an unused portion FVG2 of the guaranteed data rate DVG2 at the connection control module VCTL. If the user terminal T1 subsequently needs the complete data rate DVG1 again, for example because the user S1 is retrieving the remainder of the video sequence or because he or she is retrieving speech data from the data server CS1, the browser BRW or the communications module KOM will notify this to the network node SW1, with the connection control module of the latter receiving the corresponding command via a receive function RCV and reducing the value FVG1 in accordance with the instruction, possibly even setting it to zero.

The network nodes SW1, SW2 and the gateway GW can communicate the respective unused portions FVT1, FVT2, FVG1, FVG2 to each other within the scope of a signaling protocol, for example. The respective aforementioned data are stored by the connection control modules, so that unused portions of guaranteed data rates can be used for other data transfers. This could also be referred to as a decentralized solution, in which the network controller CTR is not necessary in principle.

In an embodiment of the invention with "centralized" control, however, which will now be described, the network controller CTR is present. The network nodes SW1, SW2 and the gateway GW communicate the respective necessary guaranteed data rates DVT1, DVT2, DVG1, DVG2 and the respective unused portions FVT1, FVT2, FVG1, FVG2 to the network controller CTR over connections VS1, VS2, and VCG, respectively. Thus, in a first step, the network controller serves as a common database, so to speak, from which the above data rates can be retrieved by the network nodes SW1, SW2 and the gateway GW, respectively. In the example shown in FIG. 3, therefore, the respective data rates are recorded only in the connection control module VCTL of the network controller CTR, but not in the connection control module VCTL of the network node SW1. Accordingly, the connection control module VCTL of the network node SW1 contains only the receive function RCV, the measuring function VMSR, and the connection function EST.

It is also possible, however, that the network controller CTR not only stores information about guaranteed data rates and portions not used by the latter but also instructs the network nodes SW1, SW2 and the gateway GW regarding other uses of unused portions of guaranteed data rates. The network controller CTR has a general view, so to speak, of the load conditions in the communications network PSTN and can thus see to an optimum utilization of existing network capacity.

Going on from the previous example, in which the user terminal T1 has deregistered, so to speak, a currently unused portion of the guaranteed data rate DVG1 with the network node SW1 because the user S1 has interrupted a video sequence, the following sequence of operations is also possible. The network node SW1 reports the unused portion FVG1 directly to the network controller CTR. The connection control module VCTL of the latter receives the message via its receive function RCV and records its contents, i.e., the value FVG1, in the storage means MEMC. In addition, the connection function VMSR notifies the network facilities involved in the connection VG1, i.e., the network node SW1 and the gateway GW, that the unused portion SVG1 can be used for another data transfer.

In all of the aforementioned examples, the connection control modules VCTL delete the respective guaranteed data rates DVT1, DVT2, DVG1, DVG2 recorded for the connections VT1, VT2, VG1, VG2 when the respective connections are released.

For the transmission of the data that are transmitted at a guaranteed data rate, use is preferably made of a connection-oriented protocol. For example, the video data that are sent from the data server CS1 to the user terminal T1 are preferably transmitted using the Transmission Control Protocol/Internet Protocol (TCP/IP). If and to the extent that unused portions of guaranteed data rates have to be transmitted, a connectionless communication protocol will preferably be used. For the data that are sent from the data server CS2 to the user terminal T3 during the existence of the connections VG1, VG2 between data server CS1 and user terminal T1 and between data server CS2 and user terminal T2, the User Datagram Protocol (UDP) could be used.

It is to be understood that arbitrary combinations of the measures and arrangements set forth in the claims and the description are also possible. Furthermore, arbitrary implementations of the inventions are possible.

For example, the unused portions FVT1, FVT2, FVG1, FVG2 need not be recorded by the connection control modules VCTL. It also suffices if only the total transmission capacity of a connection as well as the sum of the portions of guaranteed data rates that are actually being used by the transmission capacity are known, so that a free portion of the transmission capacity that can be used for further data transfers can be determined.

The communications module KOM may form part of the connection means TRT and may also be implemented, for example, as a hardware component and/or at least partly by a processor associated with the connection means TRT. The same applies analogously to the connection control modules VCTL that may be contained in the connections means TRSW, TRC, TRG.

Between, on the one hand, the user terminals T1, T2 or the communications modules KOM executed thereby, KOM, and, on the other hand, the network NET or its network nodes SW1, SW2 and/or the network controller CTR (or the connection control modules executed by these devices, VCTL), a negotiation procedure can be carried out in which the respective unused portions FVT1, FVT2, FVG1, FVG2 are negotiated interactively between the devices or program modules involved.

The network NET may enter a charge credit for the user terminals T1–T5 if and to the extent that the latter temporarily release respective unused portions FVT1, FVT2, FVG1, FVG2 for other data transfers.

It is also possible that the network NET performs data transfers for particularly low charges if the respective data transfers take place on the otherwise unused portions FVT1, FVT2, FVG1, FVG2 of guaranteed data rates, i.e., if the respective data transfer is performed only if the respective unused portions FVT1, FVT2, FVG1, FVG2 of guaranteed data rates are available for the respective low-charge data transfer.

The invention claimed is:

1. A method of transmitting data at a time-variable data rate wherein
    a user terminal sends to a network facility of a network a request for a connection to a communication partner with a guaranteed data rate,
    the network establishes the connection with the communication partner and makes available the guaranteed data rate therefor,
    the user terminal performs a first data transfer on the connection to the communication partner, and
    the connection is released, and
    wherein the following steps are carried out at least once during the existence of the connection:
    determining a portion of the guaranteed data rate not currently used by the user terminal; releasing the unused portion for at least a second data transfer; and
    if the user terminal requires, again making available the entire guaranteed data rate including the previously released portion, to the user terminal.

2. A method as set forth in claim 1, wherein the user terminal and/or a program module executed thereby determine the respective actually necessary data rate and/or the respective currently unused data rate and communicate said data rates to the network, particularly to the network facility.

3. A method as set forth in claim 1, wherein the network, particularly the network facility, determine the respective actually necessary data rate and/or the respective currently unused data rate.

4. A method as set forth in claim 1, wherein data transmitted in the course of the first data transfer are transmitted as data with a high quality of service, particularly as real-time data.

5. A method as set forth in claim 1, wherein data transmitted in the course of the second data transfer are transmitted as data with a quality of service lower than that of the data transmitted in the course of the first data transfer.

6. A method as set forth in claim 1, wherein the data transmitted in the course of the first data transfer are transmitted using a connection-oriented protocol, and/or that the data transmitted in the course of the second data transfer are transmitted using a connectionless protocol.

7. A method as set forth in claim 1, the network establishing at least a section of the connection on a switched path.

8. A communications module for a user terminal for transmitting data at a time-variable data rate, comprising:
   means for sending to a network facility of a network a request for a connection to a communication partner with a guaranteed data rate, for performing a first data transfer on the connection to the communication partner, and for releasing the connection, and means are for determining a portion of the guaranteed data rate not currently used during the existence of the connection and communicating said portion to the network, particularly to the network facility, with the network or the network facility being configured to release and make available the unused portion for at least a second data transfer, and if the user terminal requires, again making available the entire guaranteed data rate including the previously released portion, to the user terminal.

9. A user terminal comprising a communications module as set forth in claim 8.

10. A connection control module for a network facility of a network for transmitting data at a time-variable data rate, comprising:
    means for receiving a request from a user terminal to establish a connection to a communication partner with a guaranteed data rate, for making available the guaranteed data rate on the connection, and for releasing the guaranteed data rate on release of the connection, and means for determining, during the existence of the connection, a portion of the guaranteed data rate not currently used by the user terminal, and for releasing the unused portion for at least a second data transfer, and, if the user terminal requires, again making available the entire guaranteed data rate, including the previously released portion, to the user terminal.

11. A connection control module as set forth in claim 10, including means designed to receive a message whereby the currently unused portion of the guaranteed data rate is communicated to the connection control module, and/or means designed to check the connection for the currently unused portion of the guaranteed data rate.

12. A network facility comprising a connection control module as set forth in claim 10.

13. A communications module as set forth in claim 8, characterized in that it contains a program code which can be executed by a control means of a user terminal or of a network facility.

14. A storage means, having a communications module at said terminal according to claim 13 stored thereon.

15. A connection control module as set forth in claim 10, characterized in that it contains a program code which can be executed by a control means of a user terminal or of a network facility.

16. A storage means having a connection control module at said network facility according to claim 13 stored thereon.

17. The method of claim 1, further comprising interacting a multimodal browser with a communications module to generate said request from said user terminal.

18. The communications module of claim 8, further comprising a multimodal browser that interacts with said communications module to generate said request.

19. The connection control module of claim 10, further comprising a multimodal browser that interacts with a communications module at the user terminal to generate said request to said connection control module.

20. The storage means of claim 14, wherein said storage means is selected from the group consisting of a floppy disk, CD-ROM, DVD or hard disk drive.

21. The storage means of claim 16, wherein said storage means is selected from the group consisting of a floppy disk, CD-ROM, DVD or hard disk drive.

* * * * *